United States Patent [19]

Kawashiro

[11] 3,837,418
[45] Sept. 24, 1974

[54] WINCH UTILIZING AN AXLE OF AN AUTOMOBILE

[75] Inventor: Yasukazu Kawashiro, Ichikawa, Chiba Prefecture, Japan

[73] Assignee: Denki Kogyo Company Limited, Tokyo, Japan

[22] Filed: Aug. 7, 1972

[21] Appl. No.: 278,403

[52] U.S. Cl. ............................. 180/53 WA, 74/15
[51] Int. Cl. ............................................ B60k 25/08
[58] Field of Search......... 180/53 WA; 74/13, 14, 15

[56] References Cited
UNITED STATES PATENTS 1,442,936  1/1923  Godfrey ................................ 74/15
1,535,255  4/1925  Ryan ..................................... 74/15

Primary Examiner—Allen N. Knowles
Assistant Examiner—Thomas E. Kocovsky
Attorney, Agent, or Firm—George B. Oujevolk

[57] ABSTRACT

A winch utilizing an axle of an automobile comprising an axle formed with splines, a hub securely mounted on the axle, a coupling ring internally splined to mesh with either or both the splines formed on the axle and hub so as to effect engagement and disengagement of the axle and hub, and a drum formed with internal splines adapted to engage with the splines of said axle so as to engage with or disengage from said axle.

3 Claims, 8 Drawing Figures

FIG. 3
FIG. 4
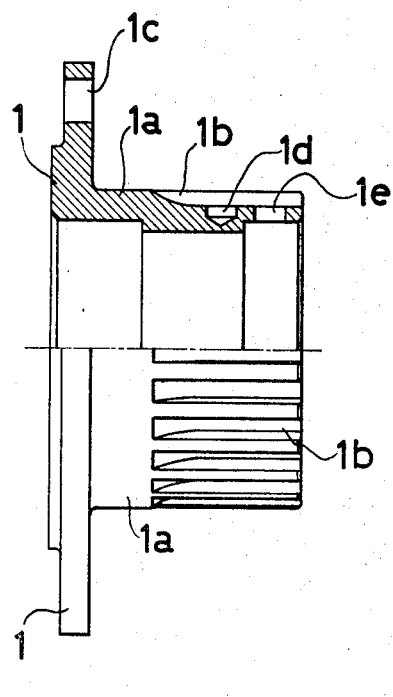
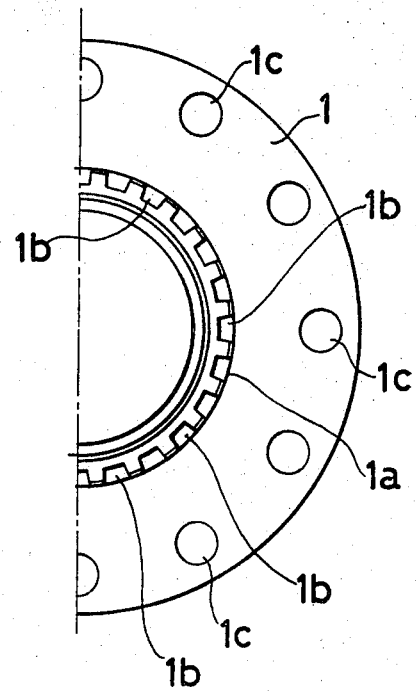

WINCH UTILIZING AN AXLE OF AN AUTOMOBILE

This invention relates to a detachable winch adapted to be mounted on an axle of an automobile to obtain its driving force therefrom.

The basic concept has now been improved in the following manner. The internal splines originally formed along the entire length of the drum and a row of external splines are replaced by two rows of internal splines, one row being separated for independent engagement and disengagement of the splines of the axle and hub whereas the other row is provided on the drum for engagement and disengagement of the drum and axle.

These improvements present the following advantages over the original concept:

1. When the automobile is to be normally driven, it is possible to remove the drum, positively couple the axle with the hub, and cap the protruding axle end for safety.
2. Once the cap has been removed the drum can be easily mounted in position even in the dark.
3. The splines on the coupling ring and the drum are safe and can be considerably shortened in length.
4. The construction is greatly simplified.

Thus the present invention provides a winch utilizing an axle of an automobile comprising a coupling ring capable of simultaneously engaging with splines formed on an axle and a hub to effect engagement and disengagement of the axle and hub, and a detachable drum formed with splines adapted to be meshed with the splines of the axle to effect engagement and disengagement of the axle and drum.

The present invention will be fully understood on reading the following description in conjunction with the drawings showing a preferred embodiment of the invention. In the drawings:

FIG. 3 is a side view, partly in section, of the hub for the axle;

FIG. 4 is a front view of a half of the hub;

Figure 1:
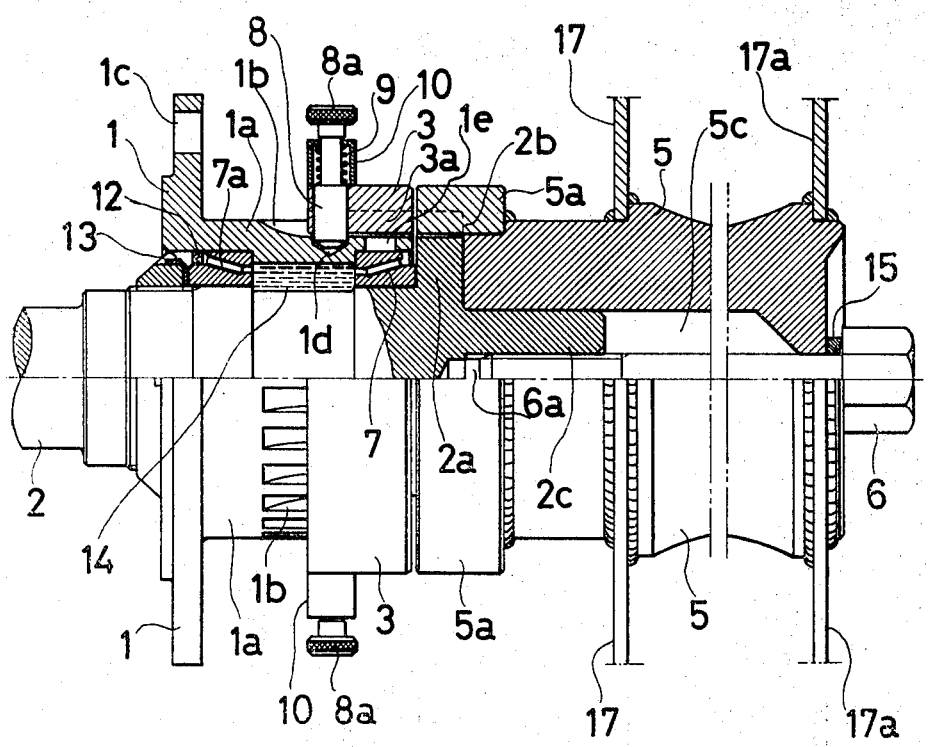
FIG. 1 is a side view, partly in section, of a winch mounted for operation on an axle of an automobile in accordance with this invention.
Figure 5:
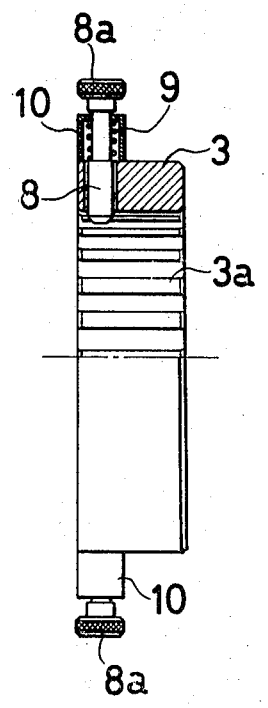
FIG. 5 is a side view, partly in section, of a spline coupling ring.
Figure 6:
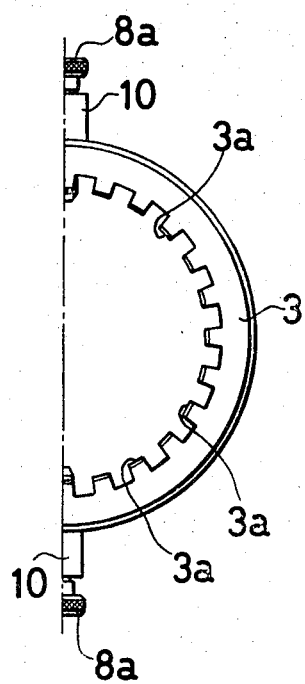
FIG. 6 is a front view of a half of the coupling ring.
Figure 8:
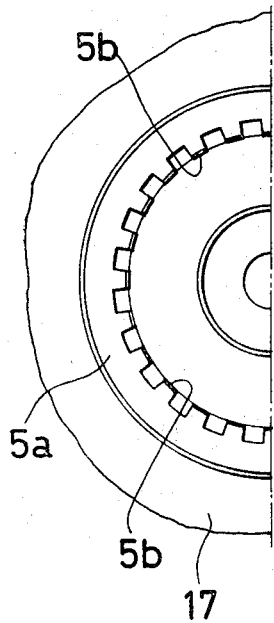
FIG. 8 is a front view of a half of the drum.
Figure 7:
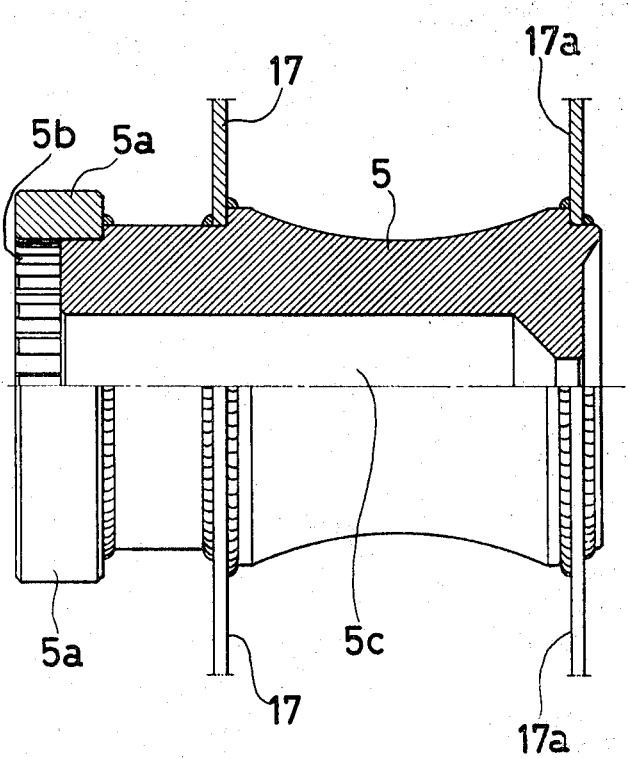
FIG. 7 is side view, partly in section, of a drum.

Referring specifically to FIG. 1, there is shown a hub 1 to be secured to an automobile wheel. On the cylindrical part 1a of the hub 1 are formed splines 1b as better shown in FIGS. 3 and 4. The hub is also formed with holes 1c for bolting to a wheel. A rear axle of the automobile is indicated at 2. Close to an outer end of the axle 2 is integrally formed a flange-shaped ring 2a which has on its periphery splines 2b of the same number of keys and the same contours as those of the splines 1b on the periphery of the cylindrical part 1a of the hub 1. On the axle 2 constructed in the manner described is rotatably mounted the hub 1 with bearings 7, 7a. The bearing 7a is provided with a seal member 12 and is secured in position by lock nuts 13 on the axle 2. Lubricant 14, such as grease, is filled in a space defined between the hub 1 and axle 2. A coupling ring 3 is slidably mounted on the hub 1 with its internal splines 3a in mesh with the splines 1b formed on the periphery of the cylindrical part 1a of the hub. As illustrated in detail in FIGS. 5 and 6, the coupling ring 3 axially slides on the splines 1b, when the automobile runs, until its splines 3a mesh with the splines 2b of the flange-shaped ring 2a on the axle 2, so that the power can be transmitted from the axle 2 to the wheel via the hub 1. A drum 5 constitutes a winch, and on its periphery, as shown in FIG. 7, a pair of end plates 17, 17a in a suitably spaced relation are welded in position, thus permitting winding of wire rope around the portion of the drum 5 between the end plates. A spline member 5a is welded to one end portion of the drum 5 and is internally splined 5b to mate with the splines 2b of the flange-shaped ring 2a. The drum 5 has an axial hollow 5c open from the end of the drum equipped with the spline member 5a and tapering toward the other end to receive a shaft-like guide portion 2c axially protruding from the flange-shaped ring 2a.

When the drum 5 is to be coupled to the axle 2 of the automobile, a knob 8a at the head of a pin 8 inserted into the coupling ring 3 is pulled up by hand and is caused to drop into one of positioning holes 1d formed in the splines 1b, so that the internal splines of the coupling ring 3 can be disengaged from the splines 2b of the flange-shaped ring 2a. At the same time, the internal splines 5b of the spline member 5a on the drum 5 are engaged with the splines 2b. In this state the guide portion 2c axially protruding from the flange-shaped ring 2a fits into the hollow 5c of the drum 5. Then, as shown in FIG. 1, a bolt 6 is inserted into the hollow from the drum end surrounded by the end plate 17a for thread engagement with an internally threaded hole 6a formed in the axial center of the guide portion 2c. Numeral 15 indicates a washer. In this way, the rotational force of the axle 2 is transferred not to the hub 1 but to the drum 5 to permit winching operation.

Figure 2:
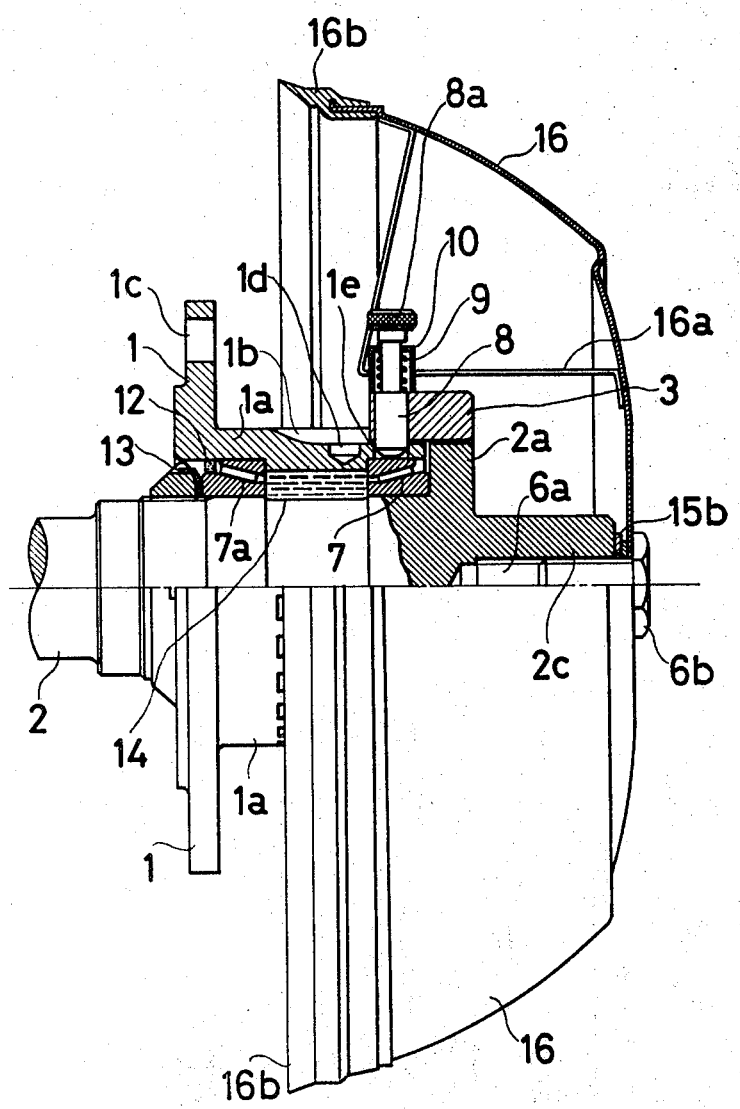
FIG. 2 is a side view, partly in section, of the axle of an automobile to form a part of the winch, capped for a normal run of the vehicle.

For a normal run of the automobile, the drum is removed by unfastening the bolt 6. Since this will release the internal splines 5b of the spline member out of engagement with the splines 2b of the flange-shaped ring 2a on the axle 2, it is necessary that the coupling ring 3 be caused to slide rightwardly as viewed in FIG. 1 so that its internal splines come in mesh with the splines 2b of the flange-shaped ring 2a. This is accomplished by pulling up the knob 8 against the action of a spring 9 loaded in a case 10, so that the pin 8 is forced out of the positioning hole 1d, and then the coupling ring 3 is caused to slide along the splines 1b formed in the cylindrical part 1a of the hub 1 until its internal splines mesh with the splines 2b of the flange-shaped ring 2a. In this condition, as illustrated in FIG. 2, the pin 8 drops in another positioning hole 1e formed in the splines 1b to secure the coupling ring 3 in position. In order to ensure the safety during the running of the automobile, a cap 16 which is large enough to cover the winch assembly as a whole is bolted to the guide portion 2c. To be more exact, the cap 16 is secured to the guide portion by a bolt 6b in thread engagement with an internally threaded hole 6a formed in the guide portion of the axle 2 via a washer 15b. The cap 16 is reinforced with stays 16a and is rimmed with an annular member 16b of an elastic material, such as rubber or synthetic resin, to be kept in contact with a side wall of a tyre. The annular member 16b contacts the tyre so closely that it does not permit ingress of dirt, water and other foreign matter into the assembly including the splines 1b of the hub 1. As stated above, the axle 2 and the hub 1 are safely coupled together by the coupling ring 3 when the automobile is normally driven. Further safety is provided by the cap 16 which covers the assembly.

With the construction above described, the winch utilizing an axle of an automobile in accordance with this invention can satisfactorily achieve the advantages (1) to (4) mentioned earlier.

The winch utilizing an automobile axle according to my invention is not limited to the embodiment shown but numerous modifications and alterations are possible without departing from the spirit and scope of the invention.

What is claimed is:

1. A winch arrangement mounted on and driven by an automobile axle comprising in combination:
   a. a hub (1) to be secured to an automobile wheel, said hub having a cylindrical part (1a) with first splines (1b) thereon and retaining apertures engaging said hub;
   b. a rear axle with a flange-shaped ring (2a) said ring having on its periphery, second splines (2b) corresponding in number and contour to said first splines, and a guide portion (2c) on said ring, said hub (1) being mounted on said rear axle (2) with bearings (7, 7a) therebetween;
   c. a wheel coupling ring (3) with interval splines (3a) slidably mounted on said hub, said internal splines (3a) meshing with said first splines (16) said coupling ring (3) being so disposed that said internal splines (3a) can slide over and mesh with said second splines (2b), an outer pin (8) on said coupling ring resiliently engaging said retaining apertures; and,
   d. a removable winch (5) with a defined inner end having an internal spline (5b) at said innter end and a tapered axial hollow (5c) disposed to receive said ring guide protion (2c) and fastening means to fasten said winch and said guide portion.

2. A winch according to claim 1 wherein the whole winch assembly is covered by a cap when the automobile is normally driven.

3. A winch according to claim 2 wherein the cap is rimmed with an annular member of an elastic material for an intimate contact with a side wall of a wheel of the automobile.

* * * * *